(12) United States Patent
Lassesen

(10) Patent No.: US 6,560,607 B1
(45) Date of Patent: May 6, 2003

(54) CLIENT SIDE BULK UPDATES ON THE WORLD WIDE WEB

(75) Inventor: Kenneth M. Lassesen, Kingston, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/309,371

(22) Filed: May 11, 1999

(51) Int. Cl.[7] .............................................. G06F 17/30
(52) U.S. Cl. ..................... 707/101; 707/10; 707/104.1; 709/227
(58) Field of Search ...................... 707/1–10, 200–205, 707/104.1; 709/212, 219, 227, 228, 206, 200–203, 225, 239, 217, 224, 226; 345/748, 760, 740–743

(56) References Cited

U.S. PATENT DOCUMENTS

| 5,768,510 A | * | 6/1998 | Gish | 707/203 |
| 5,790,793 A | * | 8/1998 | Higley | 709/218 |
| 5,898,835 A | * | 4/1999 | Troung | 395/200.47 |
| 5,956,709 A | * | 9/1999 | Xue | 707/3 |
| 6,003,032 A | * | 12/1999 | Bunney et al. | 707/10 |
| 6,101,510 A | * | 8/2000 | Stone et al. | 707/513 |
| 6,112,197 A | * | 8/2000 | Chatterjee et al. | 707/3 |
| 6,134,548 A | * | 10/2000 | Gottsman et al. | 707/5 |
| 6,151,602 A | * | 11/2000 | Hejlsberg et al. | 707/10 |
| 6,151,609 A | * | 11/2000 | Truong | 707/505 |
| 6,178,439 B1 | * | 1/2001 | Feit | 709/200 |
| 6,202,060 B1 | * | 3/2001 | Tran | 707/3 |
| 6,330,594 B1 | * | 12/2001 | Swart | 709/219 |

* cited by examiner

Primary Examiner—John E. Breene
Assistant Examiner—Mohammad Ali
(74) Attorney, Agent, or Firm—Banner & Witcoff, Ltd.

(57) ABSTRACT

A data structure and method of modifying at least one record in a database is disclosed. A client displays a plurality of database elements in a Web browser. A user utilizes the Web browser in order to modify one or more of the database elements. After the user has finished modifying the database elements, the modified elements are encapsulated into a data structure. The data structure converted to a string is then transmitted from the client to the Web site. The data structure is then used to update the appropriate elements in the database.

9 Claims, 9 Drawing Sheets

CLIENT SIDE BULK UPDATES ON THE WORLD WIDE WEB

TECHNICAL FIELD OF THE INVENTION

The present invention relates to the field of network browsing software and, in particular, to a data structure and a method of using a client computer to modify at least one record in a database.

BACKGROUND OF THE INVENTION

In recent years, there has been a tremendous proliferation of computers connected to a global network known as the Internet. A "client" computer connected to the Internet can download digital information from "Web site" computers connected to the Internet. Client application and operating system software executing on client computers typically accepts commands from a user and obtains data and services by sending requests to Web site applications running on computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and other protocols.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents (i.e. otherwise known as Web pages).

A Web site may use one or more computers that are able to store and distribute documents in one of a number of formats including the Hyper Text Markup Language (HTML). An HTML document can contain text, graphics, audio clips, and video clips, as well as metadata or commands providing formatting information. HTML documents also include embedded "links" that reference other data or documents located on the local computer or network computers.

A Web browser is a client application, software component, or operating system utility that communicates with Web site computers via FTP, HTTP, and Gopher protocols. Web browsers receive Web documents from the network and present them to a user. Internet Explorer, available from Microsoft Corporation, of Redmond, Washington, is an example of a popular Web browser.

A Web Data Service (WDS) application is an application that exchanges data between a browser, a Web site and a data source. More particularly, WDS components work together to bring data over the Internet (or a user's intranet) to be displayed as a Web page in the client's Web browser. The term data source includes databases and applications generating data (such as monitoring applications). In addition, WDS applications allow updated information to be sent back across the network and merged into the data source, if applicable.

In the past, WDS applications have been used in conjunction with Web browsers for report generation purposes. However, there are problems with using these types of Web reporting schemas (i.e. database system structures). For example, current Web reporting schemas require heavy network transmissions due to the large size of the transmitted data. In addition, current Web reporting schemas are slow due to network factors such as high latency (i.e. the amount of time it takes a packet to travel from a source to a destination) and low bandwidth (i.e. the amount of data that can be transmitted in a fixed amount of time). Further, current Web reporting schemas require a continuing dialog between clients and Web sites in order to define and generate a report. Furthermore, current Web reporting schemas frequently dependent on proprietary components on the client and/or on the Web site. Some examples of current WDS implementations are: Remote Data Services from Microsoft Corporation of Redmond, Washington and Level/5 Quest from Level/5 Research of Melbourne, Fl.

Accordingly, it is an object of the present invention to provide an improved method of allowing a client to update at least one record in a remote data source.

It is a further object of the present invention to provide an encapsulated data structure that can be sent as a single transmission from a client to a server in order to update a data source.

SUMMARY OF THE INVENTION

The method of the present invention allows users to modify at least one record in a data source, typically a database. A client displays a plurality of database elements in a Web browser. A user utilizes the Web browser in order to modify one or more of the database elements. After the user has finished modifying the database elements, the modified elements are encapsulated into a data structure. The data structure is then transmitted from the client to the server. The data structure is used to update the appropriate elements in the database.

The data structure of the present invention is stored on a computer-readable medium. The data structure includes a first field that identifies at least one record in the database to be updated. The data structure also includes a second field containing updated data that is to be stored in the database record. As previously mentioned, the data structure is typically used to update modified elements in a database.

BRIEF DESCRIPTION OF THE DRAWINGS

The present invention may take physical form in certain parts and steps, embodiments of which will be described in detail in this specification and illustrated in the accompanying drawings which form a part hereof, wherein.

DETAILED DESCRIPTION OF THE INVENTION

The method of the present invention allows one or more records in a remote database to be edited, added and/or modified within any Web browser on any operating system that supports scripting or other programming languages. This method allows multiple records to be added, deleted or modified as a result of a single transmission of an encapsulated data structure across the network.

Figure 1:
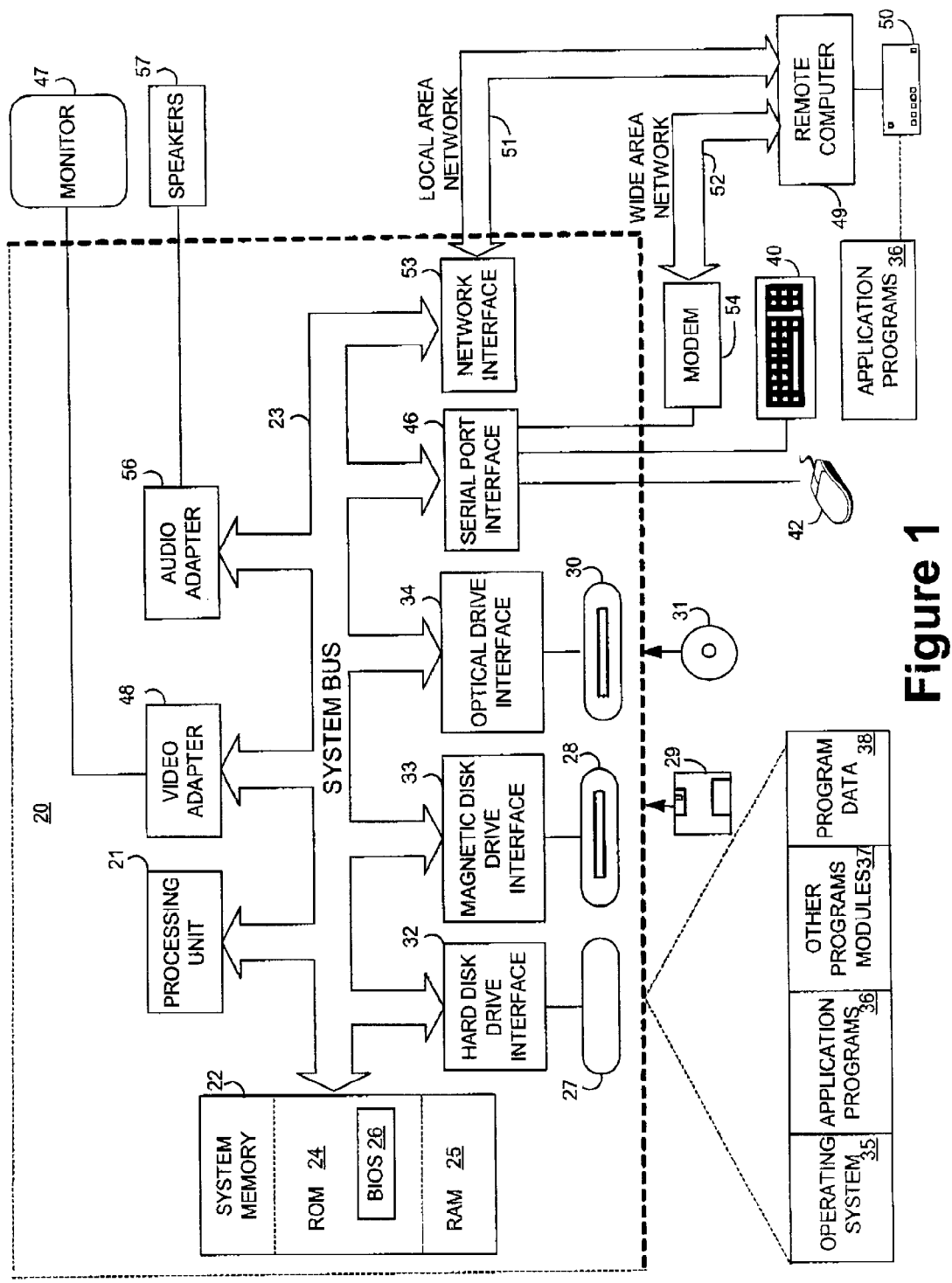
FIG. 1 is a block diagram of a general-purpose computer system for implementing the present invention.

In accordance with the present invention, a Web browser executes on a computer, such as a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As illustrated in FIGS. 2–5, the various components of a client/server system are separated into three tiers. The client tier 200 is a local computer on which either a Web browser 201 displays a Web page 202 that can display and manipulate data from a remote data source 204, or (in non-Webbased applications) a stand-alone compiled front-end application. The middle tier 206 is a computer that hosts components, which encapsulate an organization's business rules, such as a Microsoft Windows NT® Server. In addition, the middle tier can encapsulate data 604, functions or procedures render or manipulate the data 606, and information about the data 608 into a data structure 600, 602, 603. Of course, any one or more of the components 604, 606, 608 can be included in the data structure 600, 602, 603 and can be stored in any order in any field on the computer-readable medium.

Middle-tier components 204 can either be programming components such as Active Server Page scripts executed on an Internet Information Server, or (in non-Web-based applications) compiled executables. Lastly, the datas source tier 210 is a computer hosting a database management system (DBMS), such as a Microsoft® SQL Server database. In a two-tier application, the middle 206 and data source tiers 210 are combined.

Figure 2:
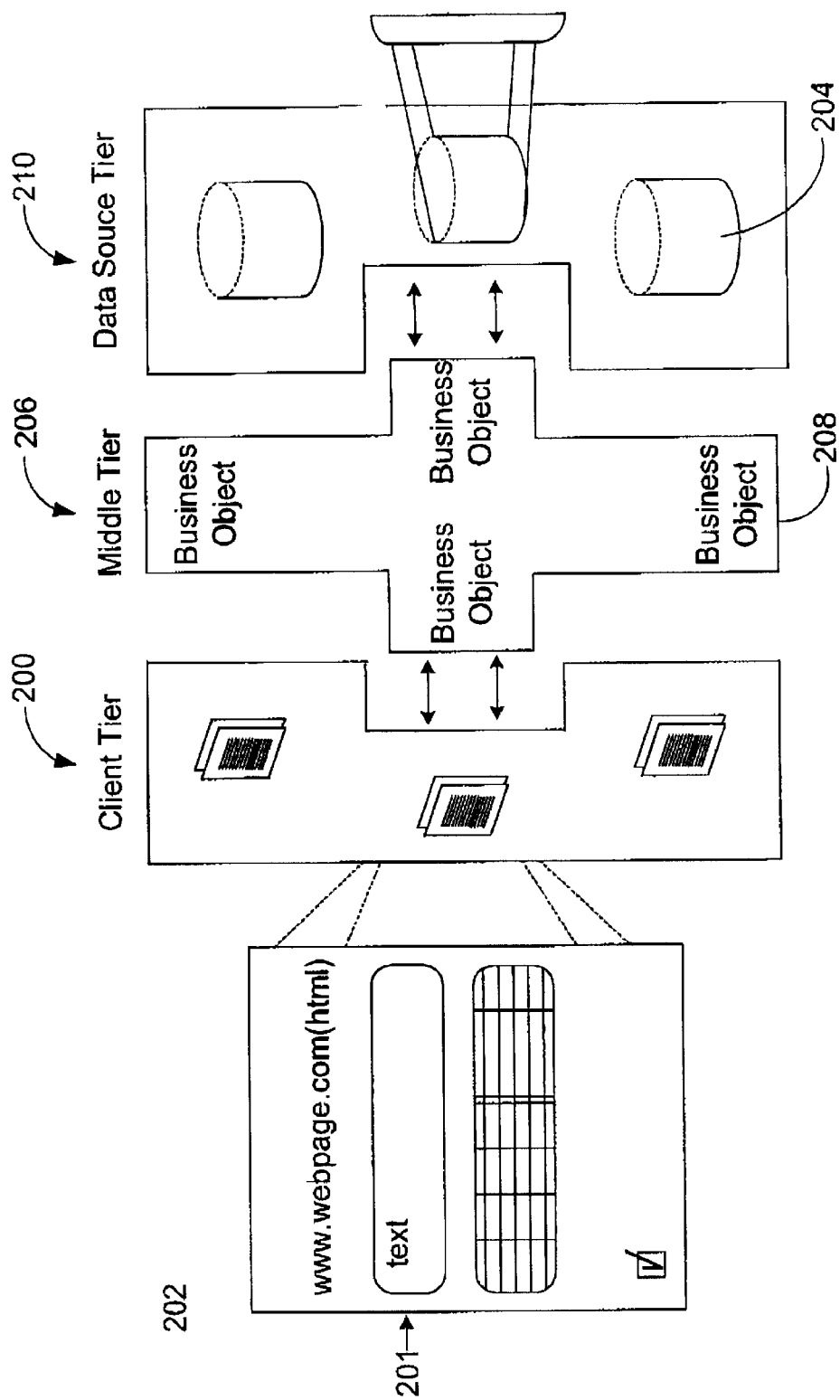
FIG. 2 illustrate client, middle and data source tiers.

These tiers 200, 206, 210 do not necessarily correspond to physical locations on the network. For example, all three tiers may exist only on two machines. One machine could be a Windows 95 or 98 computer running Microsoft® Internet Explorer 5.0 as its Web browser. The second machine could be a Windows NT® Server computer running both Internet Information Server and Microsoft® SQL Server. This approach gives developers greater flexibility when deploying processes and data on the network for maximum performance and ease of maintenance. FIG. 2 shows how these tiers make up a Web-based application.

Figure 3:
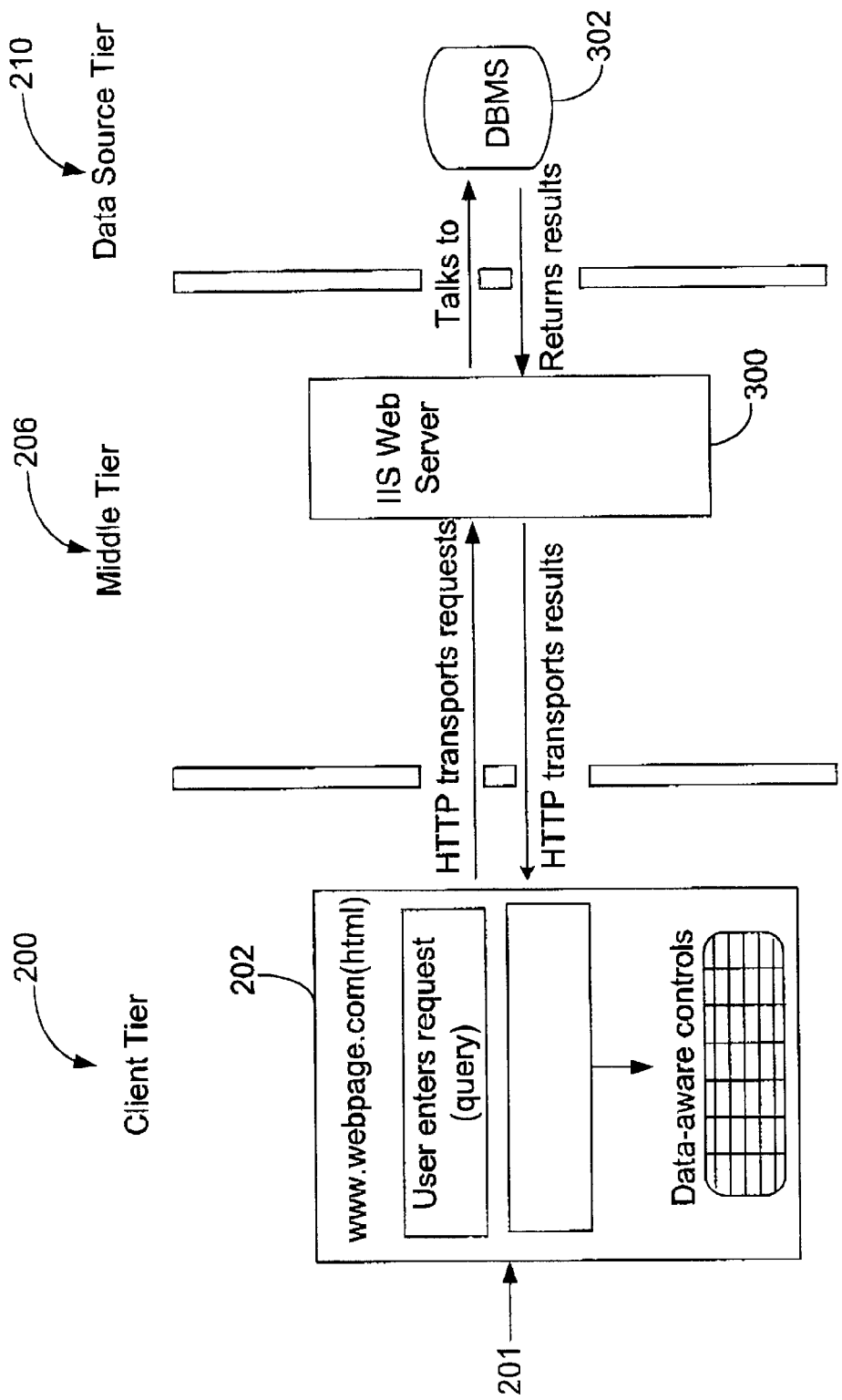
FIG. 3 is a graphical illustration of how requests to display information from a database are handled.

When an application is created, it is partitioned into two or three logical tiers. FIG. 3 illustrates how a Web-based application handles a user request to display information from a database. The client-side components are typically hosted in a Web browser 201, such as Microsoft's® Internet Explorer, that uses HTTP to communicate with the server components.

Once the user enters a request, the client-side components (e.g. in Internet Explorer) send the query to the Web server 300. The server-side components process the request and send it to the DBMS 302. The DBMS 302 responds to the request, sending back the data. The components on Web server 300 transform that data into an ADO Recordset or other suitable object. The Web server 300 then encapsulates the data 604, functions to manipulate or render the data 606, and/or information about the data 608 into a data structure 600, 602, 603 that may be sent as plain-text within a HTTP stream. This HTTP stream may also contain the HTML code that generates a web page, resulting in a single unit being transmitted to the client. Alternatively, the data structure 600, 602, 603 might merely identify functions or procedures capable of rendering or manipulating the data, instead of including the code for the functions themselves. The data structure 600, 602, 603 is converted for transport to the client and sent back across the network to the client computer. It may be displayed in the HTML page using DHTML, or supplied to applets or data-aware controls 304, such as a text box or grid through the use of a scripting or programming language. There exists no need for an ActiveX control, or java applet in the browser. This dependency solely on DHTML and any scripting language renders the method, independent of peculiarities of operating systems and browsers. The resulting data is cached on the client computer, reducing the number of connections to the Web and making it easier for a user to manipulate the data. The only calls requiring another trip to the server 300 are calls to the business object 208, such as updates to the data server or requests for new data.

Figure 4:
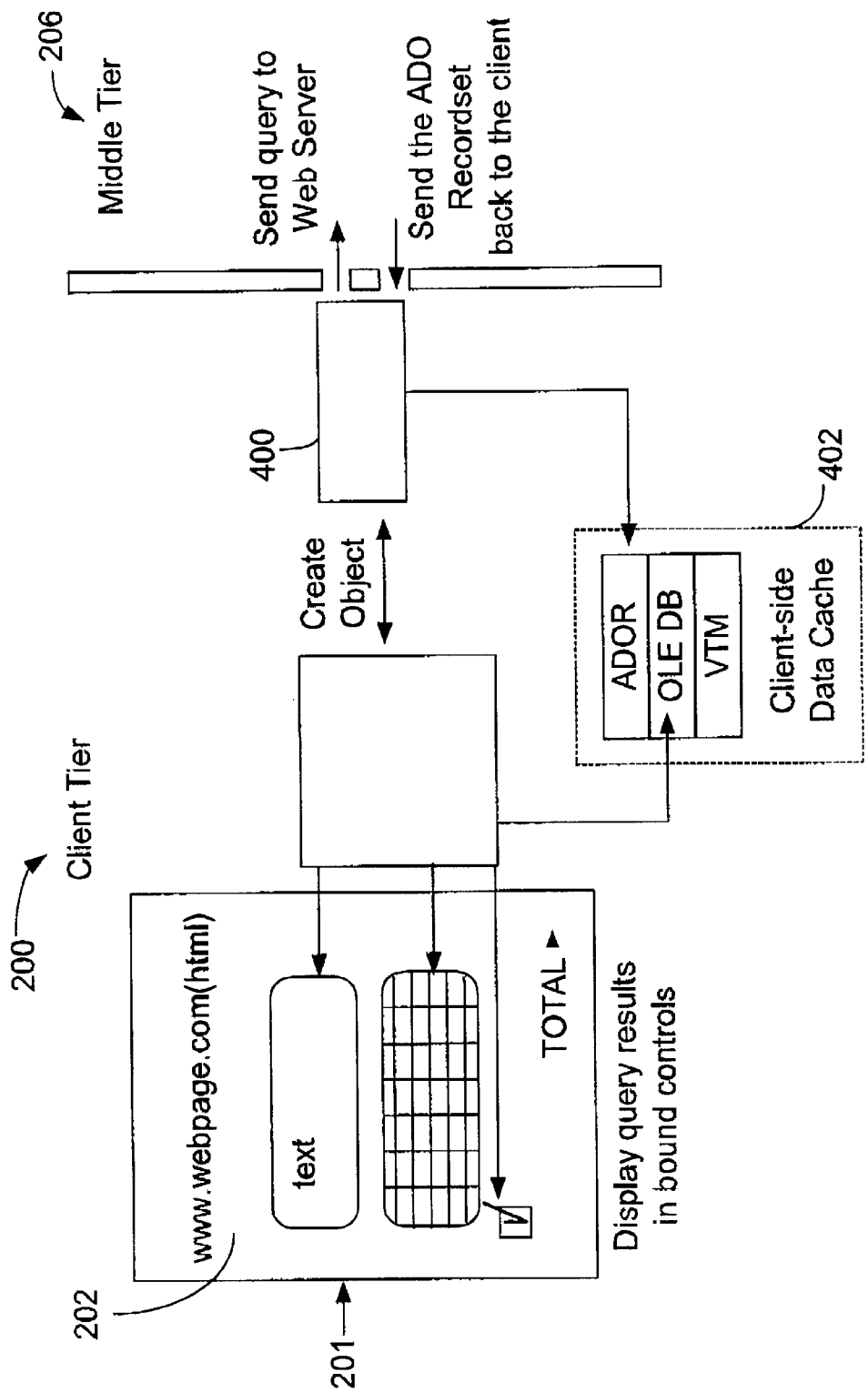
FIG. 4 shows how client-side components communicate with each other as well as with the middle tier.

The client tier 200 provides the visual interface for presenting information and gathering data. FIG. 4 shows how client-side components communicate with each other and the middle tier 206 of a Web-based application. As shown in FIG. 4, data is made available to Web page controls, and can be transported via HTTP or DCOM to the middle tier as an update, for example, through the OLE DB provider.

DCOM is shorthand for Distributed Component Object Model, an extension of the Component Object Model (COM) to support objects distributed across a network. DCOM was developed by Microsoft. Since 1996, it has been part of Windows NT®, and is also available for Windows® 95 and 98.

OLE is an abbreviation for object linking and embedding and is a compound document standard developed by Microsoft. It enables users to create objects with one application and then link or embed them in a second application. Embedded objects retain their original format and links to the application that created them. Support for OLE is built into the Windows® and Macintosh operating systems.

The Web page 202 represents an application front end. Developers can bind data-aware controls to data from remote servers, and view, edit, a page on the Web server.

The invention is a data-binding mechanism for displaying query results on a Web page in Internet Explorer. Multiple recordset objects may be encapsulated into the text-stream and allows the representation of results from multiple queries, in DHTML, applets or ActiveX Controls.

Figure 5:
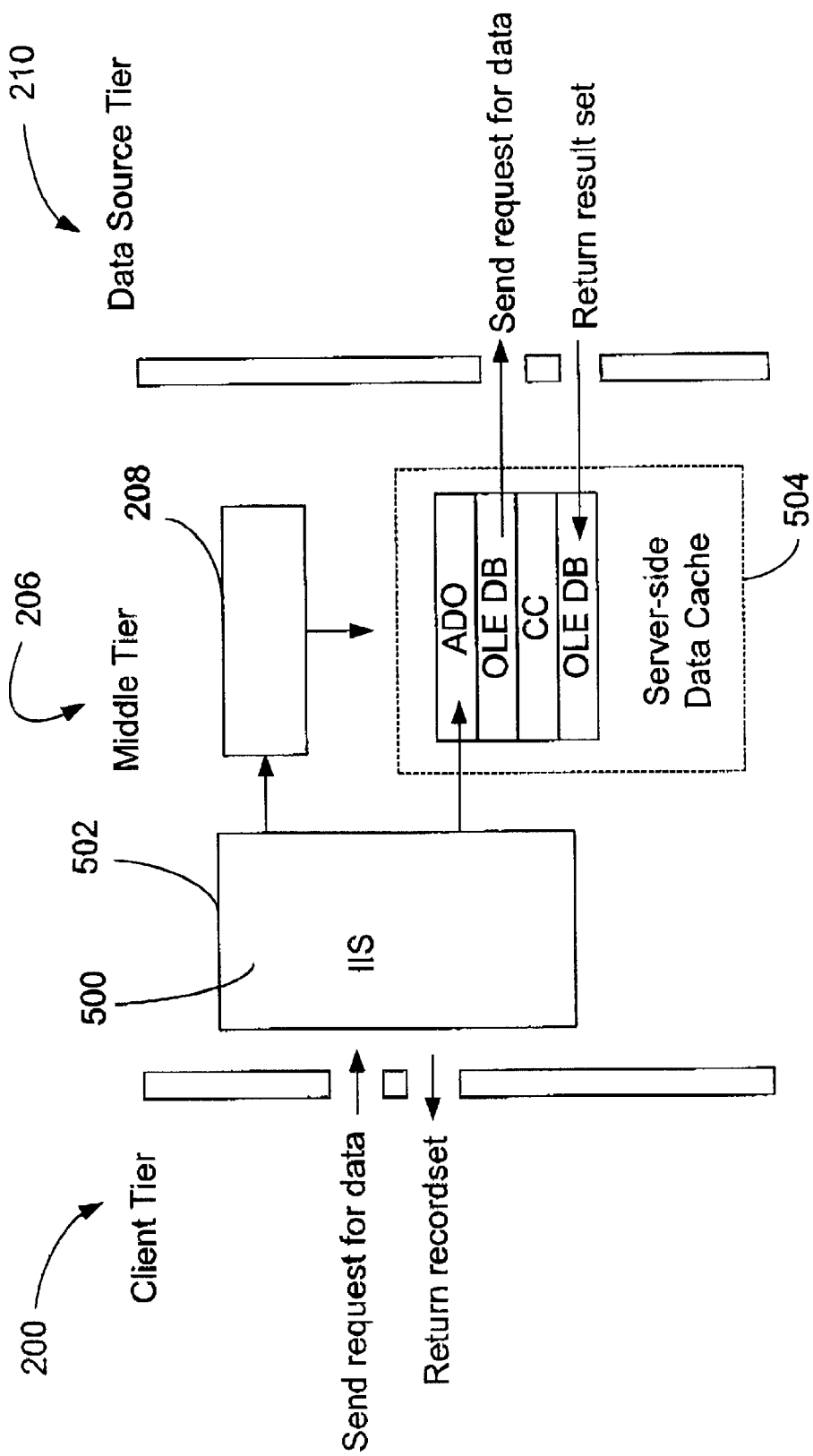
FIG. 5 illustrates some of the various potential components in the middle tier.
Figure 6:
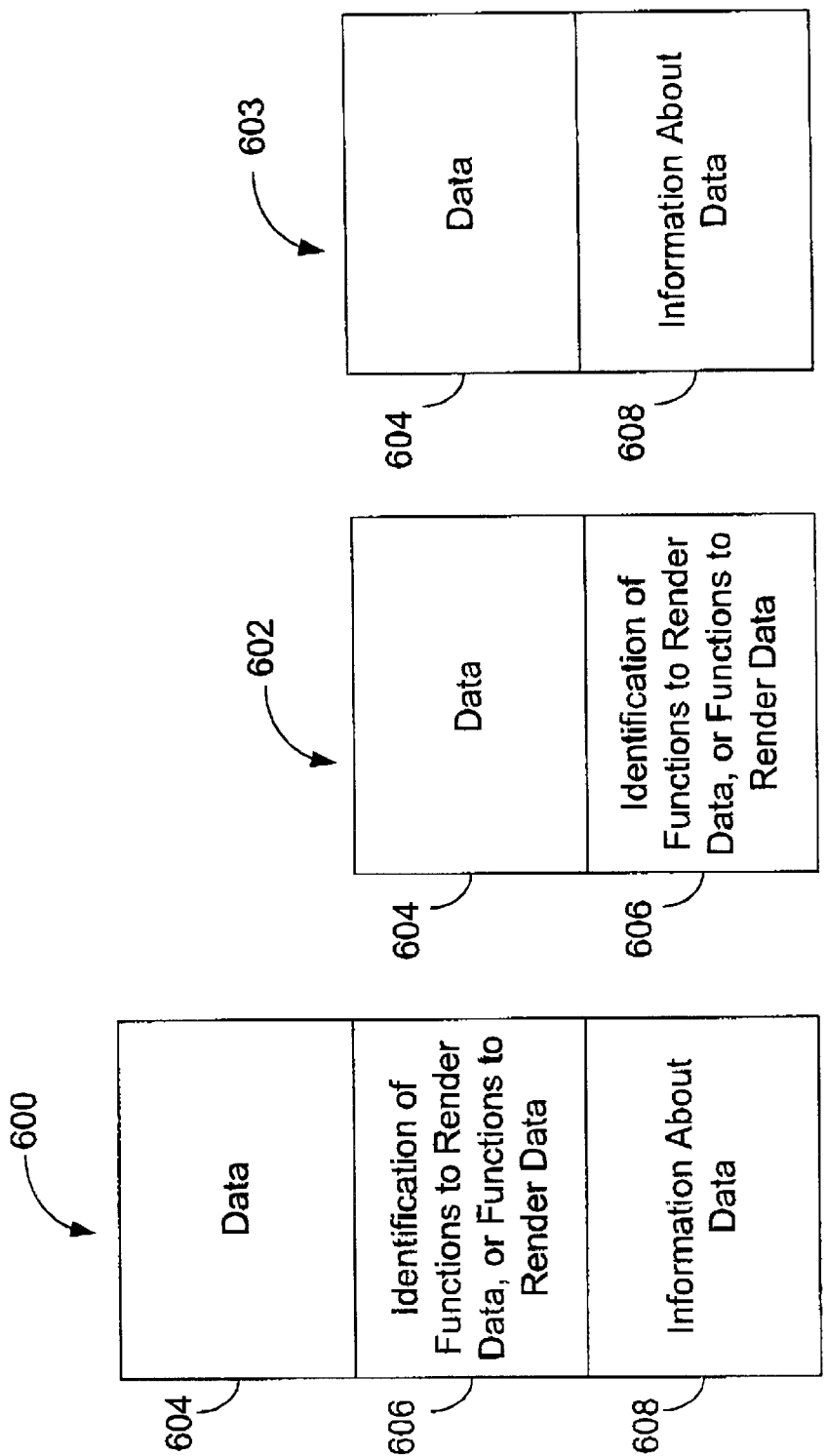
FIGS. 6A, 6B and 6C illustrate the data structure of the present invention in which the data, information about the data, and/or functions to render or manipulate the data are stored in a various fields on a computer-readable medium.

The middle tier 206 is the bridge between the client computers and database servers. The components on the middle tier 206 respond to requests from the user (or other business services) in order to execute a business task. Business objects 208 on the middle tier 206 handle the data request from the client sent through a transport protocol such as HTTP. That request is sent to the data source tier 210 through an OLE DB provider to complete the requested transaction(s). The middle tier 206 usually consists of the following components: Internet Information Server 500 and ADISAPI 502, business objects 208, and server-side data cache 504 which are substantially similar to the data cache on the client tier 402. FIG. 5 shows the various components in the middle tier 206.

The data source tier 210 defines, maintains, accesses and updates data, and manages and satisfies middle-tier requests for data. Separating data source services from the other application components allows the data structure and access mechanisms to be maintained, modified, and even re-architected when necessary without affecting application components on the client or middle tier.

The data source services may be physically implemented in a particular DBMS 302, or by a heterogeneous collection of databases, which may reside on multiple platforms and combinations of servers and mainframe computers. The DBMS 302 can be a Microsoft® SQL Server database, for example, and can use ODBC and OLE DB technology to handle all data similarly on the client side, regardless of its source. Furthermore, any database that may be programatically accessed may be used. This eliminates the need to use targeted client-side drivers for each data source.

Thus, in the present invention, data is obtained from a data source 204 by a Web site 300 and is dynamically written into an HTML Page sent as a response to a HTTP request. The example below was written using the programming language VBScript executing through an ASP code file on a Microsoft Internet Information Server. In this example, the data is obtained from an ODBC Data Source (DB) by supplying a SQL query (SQL). The data may be obtained from other sources, through other programming languages (PERL, C, CGI, etc.) and on any type of HTTP Web site software that supports any programming language. In this example, the data is written out into JavaScript, a scripting language that is available in most contemporary Web browsers (e.g. Internet Explorer, Netscape, Opera, WebTV) and operating systems (e.g. MacIntosh Operating System, Windows® 3.1, Windows® 95, Windows® 98, Windows NT®, WinCE, Unix, and WebTV). Any other script or programming language available at the client may be used, including Perl, VBScript and JavaScript.

An example of the output is shown below.

```
<%Sub rs2ja(SQL, DB) 'ASP Code executed on the Server
Dim i, rs,fAHREF,cr,cube='dt'
set rs=Server.CreateObject("ADODB.Recordset")
rs.Open SQL,DB
Response.Write "<SCRIPT LANGUAGE=JSCRIPT>"
Response.Write "//rs2j a()"+cr+"function "+cube+"__init() {"+cr
Response.Write "var d=new Array;var c=new Array;"
if not rs.eof then
For i=0 to rs.fields.count-1
        Response.Write "d["+cstr(i)+"]=
["'"+rs(i).Name+"'","+cstr(rs(i).type)+","+cstr(rs(i).attributes)+","+cstr(rs(i).definedSize)+",
"+cstr(rs(i).precision)+","+cstr(rs(i).actualsize)+"]"+cr
    Next
end if
cnt=0
if not rs.eof then
    on error resume next
    do while Not rs.eof
        Response.Write "c["+cstr(cnt)+"]=["
        cnt=cnt+1
        if isNull(rs(i).value) then
            dt="null"
        else
            dt="'"+cstr(rs(i).Value)+"'"
        end if
        For i=0 to rs.fields.count-1
            if isNull(rs(i).value) then
                Response.Write "null"
            else
                select case rs(i).type
                case 3,5,17
                Response.write rs(i).Value
                case else
                Response.write"'"
                Response.write noquotes(rs(i).Value)
                Response.write"'"
                end select
            end if
            if i <rs.fields.count-1 then
                Response.Write","
            else
                Response.Write"];" +cr
            end if
        Next
        rs.MoveNext
    loop
end if
Response.write "this.def=d;"+cr
Response.write "this.cube=c;"+cr
Response.write "this.col=new Array;"+cr
Response.write "this.filter=new Array;"+cr
Response.Write " return this}"+cr
Response.Write cube+"=new "+cube+"__init()"
Response.Write cr+"</SCRIPT>"
End Sub%>
```

The output (code) of the above routine may appear as shown in the example below. This programming code creates upon execution—in the Web browser 201 on the client—a memory array of data (dt.cube) and an array of information about the data (dt.def) which may include, but is not limited to, column name, data type, data size, and verbal description of the data.

```
<SCRIPT LANGUAGE=JSCRIPT>//rs2ja() - executed on the client/in the
browser
    function dt__init(){
    var d=new Array;var c=new Array;
    d[0]=['UserID',3,16,4,10,4]
    d[1]=['UID',3,120,4,10,4]
    d[2]=['Email',200,104,255,255,12]
    d[3]=['Password',200,104,50,255,8]
    d[4]=['Admin',11,120,2,255,2]
    d[5]=['Name',200,104,50,255,0]
```

```
    d[6]=['Active',11,120,2,255,2]
    d[7]=['LoggedOn',11,120,2,255,2]
    d[8]=['ContactID',3,120,4,10,4]
    d[9]=['Msg1',201,234,2147483647,255,0]
    d[10]=['Msg2',201,234,2147483647,255,0]
    d[11]=['Msg3',201,234,2147483647,255,0]
    d[12]=['Config',201,234,2147483647,255,0]
    d[13]=['upsize_ts',128,624,8,255,8]
    c[0]=[1,11,'REDMOND\KenL','Password','True',null,'False','False',263,null,null,null,null,''];
    c[1]=[2,12,'REDMOND\StefanW','Password1','True',null,'False','True',434,null,null,null,null,''];
    c[2]=[3,13,'REDMOND\DennisC','Password','True',null,'False','False',516,null,null,null,null,''];
    c[3]=[4,14,'REDMOND\DCOZART','Password','True','A Company','True','False',557,null,null,null,null,''];
    c[4]=[288,298,'Admin 10@Lars.conf','PassWord','True',null,'False','False',1058,null,null,null,null,''];
    c[5]=[289,299,'Admin 100@Lars.conf','PassWord','True',null,'False','False',10072,null,null,null,null,''];
    this.def=d;
    this.cube=c;
    this.col=new Array;
    this.filter=new Array;
    return this}
    dt=new dt_Unit()
    </SCRIPT>
```

The resulting memory structure created by the above code allows procedures on the client (browser) to render this data into HTML. An example of a simple procedure is shown below. This sample procedure is written in JavaScript and creates an HTML table (returned as a string) which may then be directed into an HTML element.

The user may be presented with various form elements by which the user may select different views of the same data. The code below illustrates how the user may be able to select a different view (returned by the functions, STATS, SLIST and XTAB) via an HTML Select box.

```
    function SLIST (X)(dt)//Executed on the client using 'dt'
    var t=new Array,i,r,row,f=dt.def,c=dt.cube
    var n=",h="
    for(i=0;i<f.length;i++) h=h+"<TH>"+f[i][0]+"</TH>"
    h='<Table Border=1 ><R>'+h+'</TR>'
    e='net=h'
    for (r=0;r<c.length;r++){
        w=c[r]
        if (typeof(w)=="object"){
            n="<TR>"
            for(i=0;i<w.length;i++) n=n+"<TD>"+w[i]+"</TD>"
            e=e+'+'['+r+']'
        }
    }
    g="</TABLE>"
    e=e+"+"
    return eval(e)
    }
    A person of ordinary Skill will understand that there are multiple ways of placing
this string onto the HTML page, for example, using dynamic HTML and a DIV tag
named 'Report':
    Report.innerHTML=SLIST(dt)
    Or via a frame named "MyReport"
        X=Document.frames("MyReport")
        X.document.open()
        X.document.write(SLIST(dt))
        X.document.close()
```

```
    <BODY onload=VIEWLOAD()><SELECT name=VIEW
onchange=VIEWCH()></SELECT>
    <SCRIPT LANGUAGE=JAVASCRIPT>
    var VIEWITEM=[["Statistics",STATS],["List",SLIST],["Cross Tab",XTAB] ]
    function VIEWLOAD(){
    for(i=0;i<VIEWITEM.length;i++){
        VIEW.options[VIEW.options.length]=new Option(VIEWITEM[i][0])
        VIEW.options[VIEW.options.length-1].value=i
        }
    }
    function VIEWCH(){
    var i=VIEW.selectedIndex
    DA.innerHTML=VIEWITEM[i][1](dt)
    }
```

Further reduction of the size of the data structure 600, 602, 603 may be obtained by exploiting the use of client-side caching. Placing the scripting code into "include" files (where supported), further reduces the volume of download to be a 'bootstrap' in HTML and the actual data on subsequent visit to the page (or other pages using the same routines). In other words, the data structure 600, 602, 603 includes an identification of functions capable of manipulating or rendering the data, instead of including the code for the functions themselves.

Figure 7:
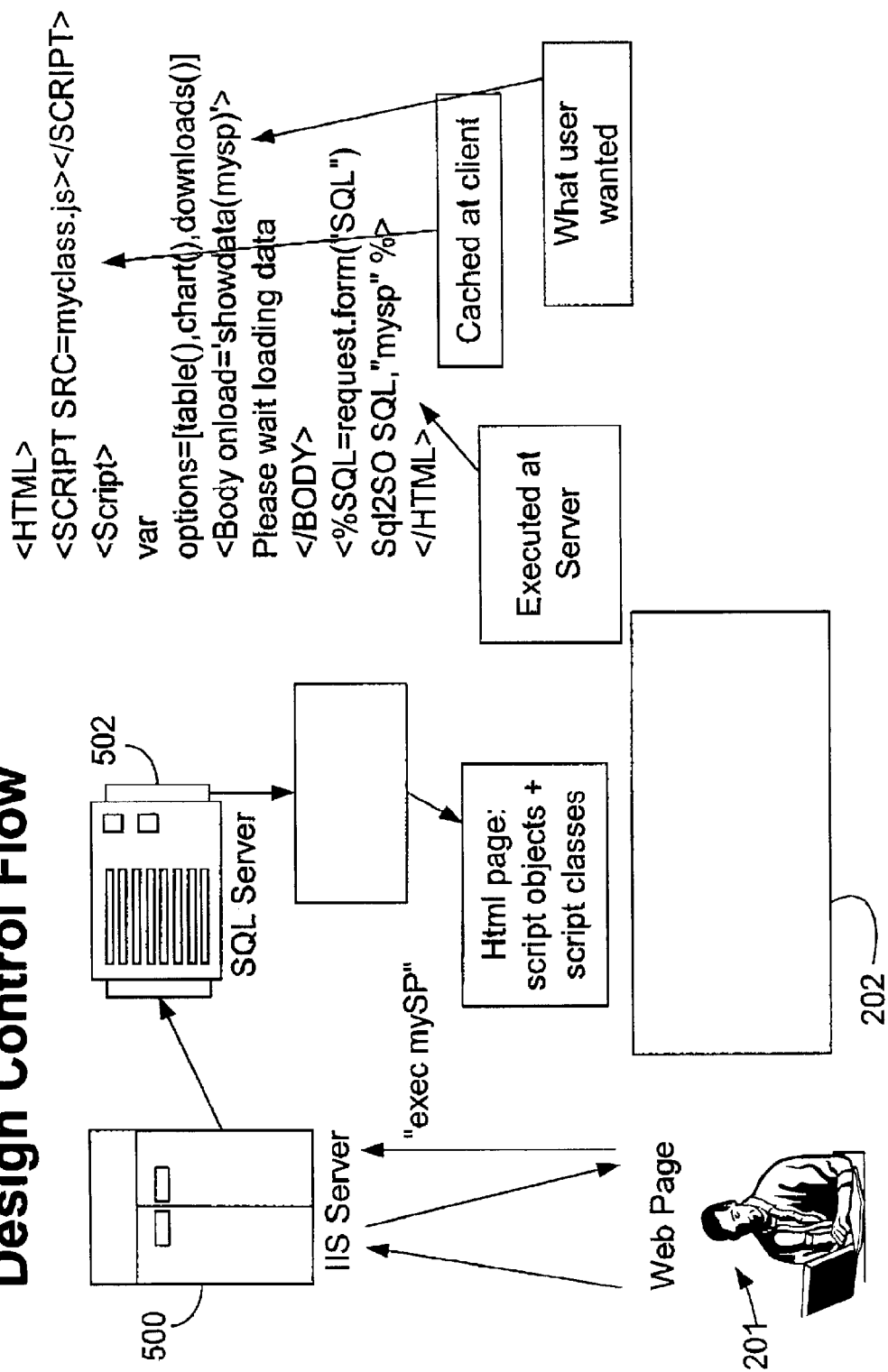
FIG. 7 depicts a graphical representation of the design control flow of the present invention.

FIG. 7 depicts a sample, graphical representation of the design control flow in order to generate reports. In this embodiment, a client uses a Web browser 201 displaying a Web page 202 to issue a request to an Web site 500. The request is sent using the HTTP protocol. In response to the request, the Web site 500 obtains data 604, information about the data 606, and/or procedures 608 to render the data, from a data source 204. The server 500 encapsulates the data 604, the information about the data 606, and/or the procedures 608 to render the data into a data structure 600, 602, 603. This data structure 600, 602, 603 is then provided to the client. The data structure 600, 602, 603 is used to generate and display at least one report (containing wizards, tables, entry forms, downloads, etc.) in a Web browser 201 on the client.

The data 604 displayed in the Web browser 201 on the client can be in any format. An example of data 604 prepared for display on the client is shown below.

```
<SCRIPT LANGUAGE=JSCRIPT>//rs2ja() - executed on the client/in the
browser
function dt__init(){
var d=new Array;var c=new Array;
d[0]=["",3,16,4,10,4]//No Column name - thus not displayed or edited.
// This field is used to identify the record for modification
d[1]=['UID',3,120,4,10,4]
d[2]=['Email',200,104,255,255,12]
d[3]=['Password',200,104,50,255,8]
d[4]=["",0,14,5,25,4]// Timestamp of record on server, 2nd column in 0
c[0]=['ID=1',11,'REDMOND\KenL','Password','1/1/80'];
c[1]=['ID=2',12,'REDMOND\StefanW','Password1','1/1/80'];
c[2]=['ID=3',13,'REDMOND\DennisC','Password','1/1/80'];
c[3]=['ID=4',14,'REDMOND\DCOZART','Password','1/1/80'];
c[4]=['ID=288',298,'Admin10@Lars.conf','PassWord','1/1/80'];
this.def=d;
this.cube=c;
this.dirty=new Array;
this.undo=new Array;
return this}
dt=new dt__init()
</SCRIPT>
```

The above data 604 may be displayed by the Web browser 201 in any format including, but not limited to, a table, graph, chart, row, column, etc. The data 604 may also be displayed in conjunction with a mechanism to edit the data. The following code illustrates an exemplary method of allowing a user to start editing the data 604. In this example, the user is provided with a button. When the user wants to edit some or all of the data 604, the user clicks on (i.e. selects) the button. This sample code then displays the data records available for editing, and allows the user to select a record to edit.

```
function edlist(dt){
var tmp="<Table Border=><TR><TH>Edit</TH>",i,r,row
for(i=0;i<dt.def.length,i++)
        if(dt.def[i][0]=="")
            tmp=tmp+"<TH>+X.def[i][0]+"</TH>"
    tmp=tmp+"</TR>"
    for (r=0;r<dt.cube.length;r++){
        row=dt.cube[r]
        if (typeof(row)="object"){
            tmp=tmp+"<TR><TH>"+(`)+"<INPUT type=button class="+
```

-continued

```
    dt.dirty[r]==true?'dirty':'button'+"Value=Edit onclick=edrow("+r+")></TH>"
        for(i=0;i<row.length;i++)
            if(dt.def[i][0]=='')
                tmp=tmp+"<TD>"+(row[i]==null?'':row[i])+"</TD
            >"
            tmp=tmp+"</TR>"
        }
    }
    tmp=tmp+"</TABLE>"
    return tmp
    }
    After the user selects a row to edit, the row is presented to the user for editing.
The following sample code illustrates one possible schema for editing database records.
    function edrow(ir){
    lastrowid=ir
    var r=dt.cube[ir],i=0,t='<TABLE>'
    for(i=minc;i<dt.def.length;i++)
        if(dt.def[i][0]=='')//only columns with names rnay be edited
        {
                    s=dt.def[i][3]
                    if(s > 40) s=40
    t=t+'<TR><TH>'+dt.def[i][0]+'</TH><TD><INPUT TYPE=TEXTBOX
    Size='+s+'Name=a'+i+'value="'+(r[i]==null?'':r[i])+'"></TD></TR>'
        }
    t=t+'</TABLE><INPUT type=button class=button onclick=saverow()
    value=Change><INPUT type=button class=button onclick=newview()
    value=Return>'
    displayarea.innerHTML=t
    }
```

After a user changes or modifies one or more records, the data is then saved into the client side data cache 402. In this example, the data is stored in an array; however, any data or programming structure could be used. The following code illustrates one method by which data can be saved into the client side data cache 402. A person of ordinary skill in the art will also readily appreciate that this code also implements the ability to undo any edit function.

```
function saverow(){
for(i=minc;i<dt.def.length;i++){
    v=document.all("a"+i).value//look for data field by col number
    if(dt.cube[lastrowid][i]!=v){
        //if original value has not been saved, then save
        if(typeof(dt.undo[lastrowid][i])=null)
            dt.undo[lastrowid][i]=dt.cube[lastrowid][i]
        dt.cube[lastrowid][i]=v//save new value
        dt.dirty[lastrowid]=true//row has changed
    }
}
}
```

Figure 8A:
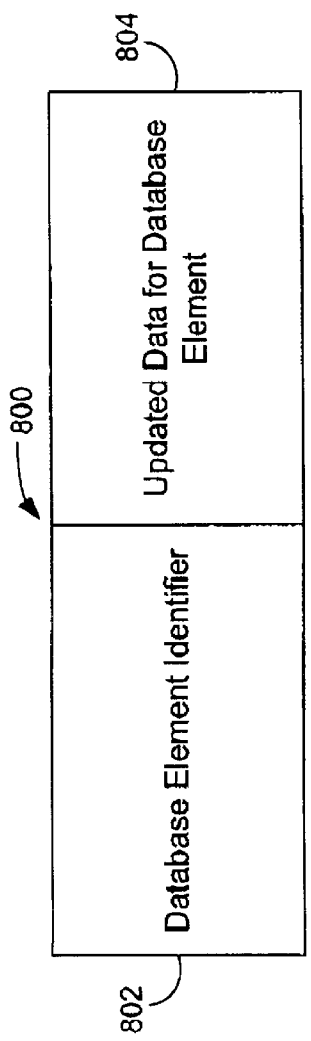
FIGS. 8A and 8B illustrate the data structure of the present invention used to update remote databases.
Figure 8B:
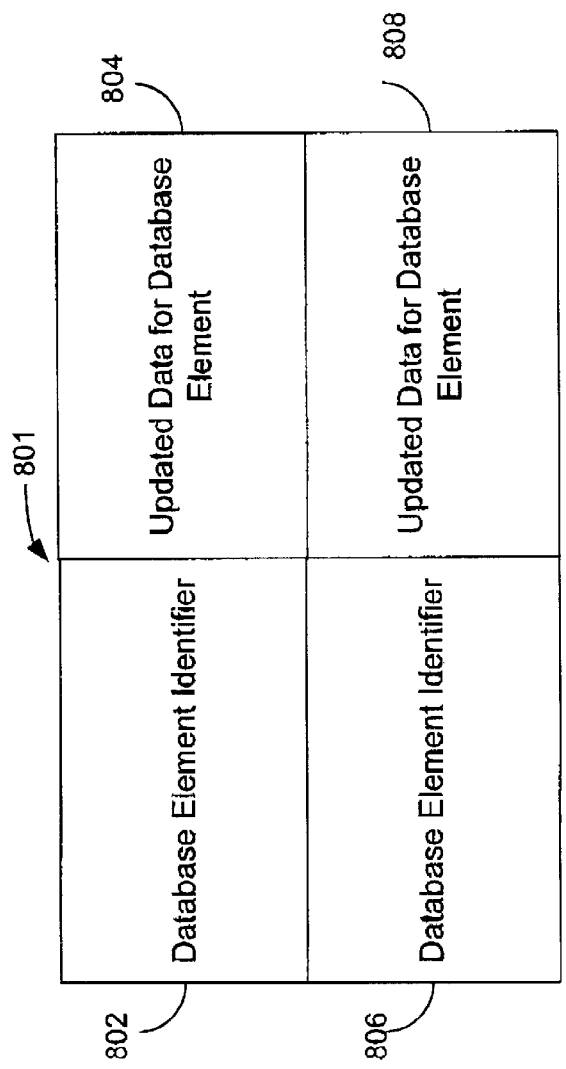

When a user decides to update the remote database with this modified data, a single, encapsulated database structure 800, 801 is created. Sample data structures 800, 801 are shown in FIGS. 8A and 8B. The data structure 800, 801 is stored on a computer-readable medium. The data structure 800, 801 includes a first field 802, 806 identifying at least one record or element to be updated in the database, and a second field 804, 808 containing updated data to be stored in the corresponding record or element in the database. As shown in FIG. 8A, the data structure 800 might merely identify only one record 802 to be updated with modified data 804. Alternatively, as shown in FIG. 8B, the data structure 801 might identify more than one record 802, 806 to be updated with modified data 804, 808. An example of this data structure 801 is shown below. In this example, the code is written in JavaScript for execution on the Web site 300.

d=new Array
   d[0]=['ID=1', 11,'REDMOND\KenL','DogFood2','1/1/80'];
   d[1]=['ID=3', 13,'REDMOND\DCozart','1CoolDude','1/1/80'];
   updatecustomerlogin(d)

After a user decides to update the remote database with the user's modified data, and after the single, encapsulated database structure 800, 801 has been created, the above-described database structure 800, 801 is sent to the Web site 300 in a single transmission. In the source code example shown below, the data structure 800, 801 is sent to the Web site via a HTML form's text area element, that is as a character string.

```
function bulkupdate(f){//f is function to call
var i,j,r,k=0,d='var d=new Array;\n'
for(i=0;i<dt.cube.length;i++)
    if(dt.dirty[i]==true)//is row dirty
    {r=dt.cube[i]//get row
        n='['//data is put into a JS array
        for(j=0;j<r.length;j++)
            if(ISCOL(j,NOQUOTE))//do we need to quote it?
                n=n+r[j]+(j<r.length-1?',':'')// add, to
```

-continued

```
separate
            else
     n=n+(r[j]==null?r[j]:""+r[j]+"")+(j<r.length-1?',':'')
         d=d+'d['+(k++)+']='+n+'];\n'//add this line to the d[]array
         }
bulk.innerHTML='<TEXTAREA NAME=bulkdata>'+d+f+'()</TEXTAREA>'
     //put the data into the form
form1.submit() //send off the data
}
```

The Web site 300 receives the data structure 800, 801 sent from the client. The Web site 300 stores the data structure 800, 801 in the server-side data cache 504. The following server-side JavaScript code uses the data structure 800, 801 to update the appropriate elements or records in the database.

var cl=datacode.split('\n')
   for(i=0;i<cl.length;i++) eval(cl[i])

Figure 9:
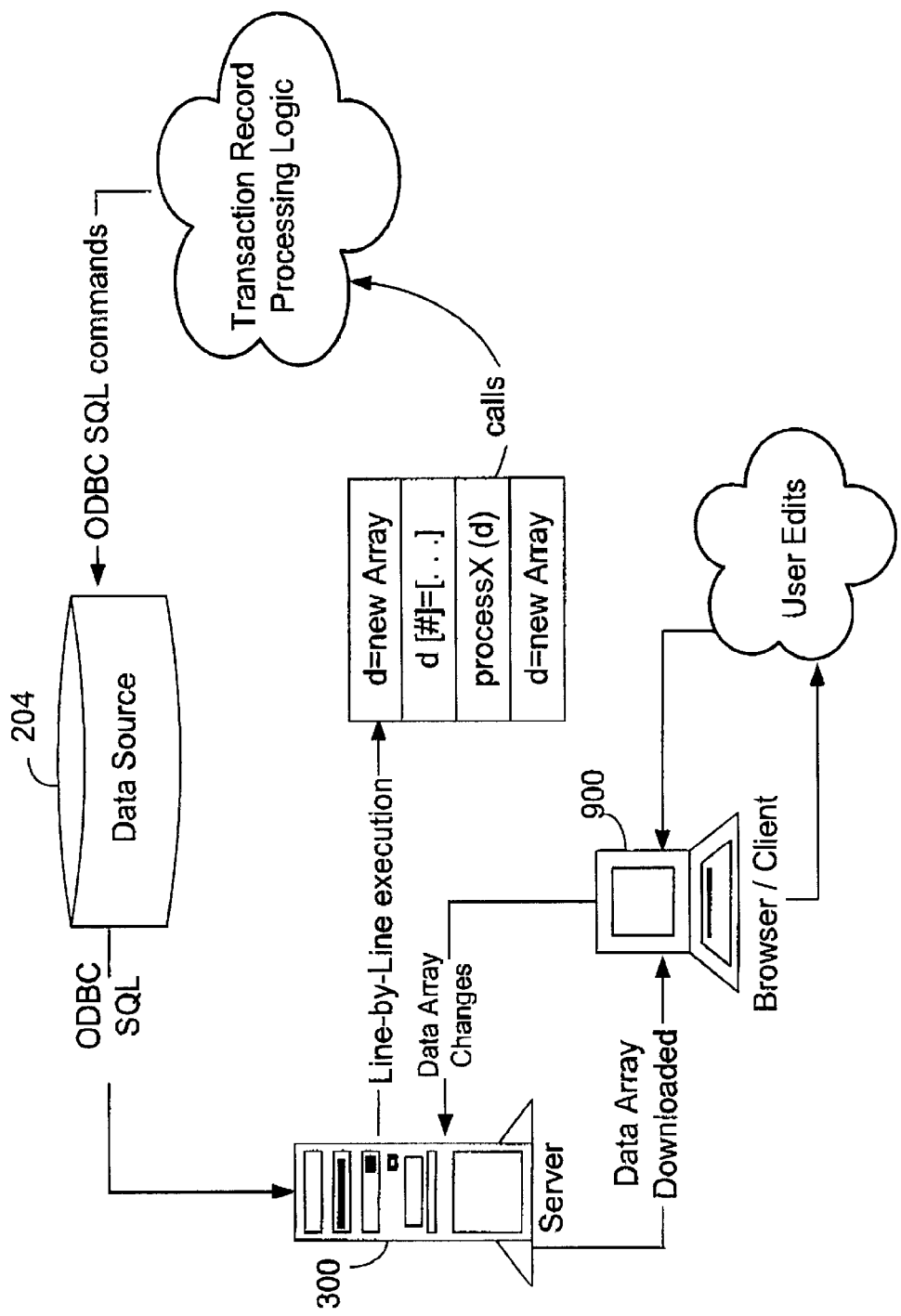
FIG. 9 is a block diagram showing an exemplary architecture of a system for implementing the present invention.

FIG. 9 shows a block diagram of an exemplary architecture of a system for implementing the present invention. As illustrated in FIG. 9, a user on a client 900 utilizes a Web browser 201 displaying a Web page 202 to issue a request to a Web site 300. In response to the request, the Web site 300 obtains data 604, information about the data 606, and/or procedures 608 to render the data, from a data source 204. The Web site 300 encapsulates the data 604, the information about the data 606, and/or the procedures 608 to render the data into a data structure 600, 602, 603. This data structure 600, 602, 603 is then provided to the client 900. The data structure 600, 602, 603 is used to generate and display at least one report (containing wizards, tables, entry forms, downloads, etc.) in a Web browser 201 on the client 900.

The data 604 may also be displayed in conjunction with a mechanism that allows the user to edit the data 604. For example, a user might click on a button when the user wants to edit some or all of the data 604. The Web browser 201 would then display the data records available for editing, and allow the user to select a record to edit. After the user selects a row to edit, the row is presented to the user for editing. After a user changes or modifies one or more records, the data is then saved into the data cache 402 on the client 900. When a user decides to update the remote database 204 with this modified data, a single, encapsulated database structure 800, 801 is created which may contain multiple updates to multiple tables across multiple databases. The data structure 800, 801 identifies each record or element to be updated in the various data sources as well as the updated data to be stored therein. One significant benefit of the present invention is that the data structure 800, 801 need not include any unmodified data records or elements; instead, the data structure 800, 801 need only identify modified data records or elements.

Once a user decides to update the remote database 204 with the user's modified data, the database structure 800, 801 is sent to the server 300 in a single transmission. On receipt, the Web site 300 stores the data structure 800, 801 in the server-side data cache 504 or memory. The server 300 then passes the information contained in the data structure 800, 801 to the appropriate or designated Web site applications or interfaces to update the appropriate elements or records in the various data sources 204. Thus, the present invention allows multiple records in multiple data sources to be updated through a single transmission across a network-unlike current schemas for updating databases.

The present invention has been described in the foregoing specification with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A computer-readable medium having computer-executable instructions for performing steps comprising:
   receiving a first data structure from a server in response to a user request, said first data structure comprising data, information about said data, identification of functions capable of manipulating said data, and procedures to render said data into a second data structure;
   displaying said data in the form of at least one report in a web browser;
   allowing said data to be modified with said web browser into updated data;
   saving said updated data into cache;
   creating said second data structure, said second data structure consisting of:
      a first field identifying at least one record in a database to be updated; and
      a second field containing said updated data to be stored in said at least one record in said database;
   encapsulating said second data structure into an encapsulation; and
   delivering said encapsulation across a network to said server in a single transmission for updating said data.

2. The method of claim 1 wherein the second data structure is an array or object and said at least one record is an element in the array or property of the object.

3. The method of claim 1 wherein the server is a Web site.

4. The method of claim 2 wherein the second data structure is written in a script language which may execute on the Internet Server, in either a complied or interpreted state.

5. The method of claim 4 wherein the script language is JavaScript.

6. The method of claim 4 wherein the script language is Perl.

7. The method of claim 4 wherein the script language is Visual Basic.

8. The method of claim 4 wherein the script language is C.

9. The method of claim 4 wherein the script language is VBScript.

* * * * *

UNITED STATES PATENT AND TRADEMARK OFFICE
CERTIFICATE OF CORRECTION

PATENT NO.    : 6,560,607 B1
DATED         : May 6, 2003
INVENTOR(S)   : Kenneth M. Lassesen It is certified that error appears in the above-identified patent and that said Letters Patent is hereby corrected as shown below:

Column 6,
Line 13, "a page on" has been replaced with -- and update data from the Web page on --;

Column 9,
Line 43, "><R>'+h+'</TR>'" has been replaced with -- ><TR>'+h+'</TR>' --;
Line 50, "e=e+'+'['+r+']'" has been replaced with -- e=e+'+'t['+r+']' --;
Line 54, "e=e+'"" has been replaced with -- e=e+'g" --;

Column 12,
Line 40, "</SCR[PT>" has been replaced with -- </SCRIPT> --;
Line 66, "(row)="object")" has been replaced with -- (row)=="object") --;

Column 13,
Line 15, "rnay" has been replaced with -- may --.

Signed and Sealed this

Sixth Day of January, 2004

JAMES E. ROGAN
*Director of the United States Patent and Trademark Office*